(12) United States Patent
Sun

(10) Patent No.: US 9,820,194 B2
(45) Date of Patent: *Nov. 14, 2017

(54) 1X MESSAGE BUNDLING

(71) Applicant: LG ELECTRONICS INC., Seoul (KR)

(72) Inventor: Li-Hsiang Sun, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,904

(22) Filed: Dec. 15, 2016

(65) Prior Publication Data

US 2017/0105149 A1    Apr. 13, 2017

Related U.S. Application Data

(63) Continuation of application No. 13/011,566, filed on Jan. 21, 2011, now Pat. No. 9,585,120.

(Continued)

(51) Int. Cl.
*H04W 4/00* (2009.01)
*H04W 36/00* (2009.01)
(Continued)

(52) U.S. Cl.
CPC ..... *H04W 36/0033* (2013.01); *H04L 61/2592* (2013.01); *H04W 36/08* (2013.01);
(Continued)

(58) Field of Classification Search
CPC ........... H04W 36/0033; H04W 76/046; H04W 68/02; H04W 36/08; H04W 88/02; H04W 80/04; H04L 61/2592
(Continued)

(56) References Cited

U.S. PATENT DOCUMENTS 7,480,510 B1    1/2009  Woleben et al.
2004/0090992 A1    5/2004  Lee
(Continued)

FOREIGN PATENT DOCUMENTS

KR    1020050054922    6/2005
KR    1020080086406    9/2008
(Continued)

OTHER PUBLICATIONS

U.S. Appl. No. 13/011,566, Office Action dated Jan. 4, 2013, 19 pages.

(Continued)

*Primary Examiner* — Faisal Choudhury
(74) *Attorney, Agent, or Firm* — Lee Hong Degerman Kang & Waimey

(57) ABSTRACT

A method includes receiving, at a network entity, a circuit switched paging request, wherein the paging request is for a UE that is attached to a packet data network and is registered to a circuit switched network. The method also includes obtaining a calling party number from the circuit switched network, the calling party number being information corresponding to a call from a party calling the UE, and generating a circuit service notification application message comprising more than one message of the circuit switch technology, such that one of message comprises the calling party number. Another operation relates to transmitting, from the network entity to the UE, the circuit service notification application message, the transmitting occurring while the UE is attached to the packet data network and while the UE is operating in an active state for receiving and/or transmitting packet data or signaling messages.

20 Claims, 18 Drawing Sheets

Related U.S. Application Data

(60) Provisional application No. 61/297,192, filed on Jan. 21, 2010, provisional application No. 61/297,175, filed on Jan. 21, 2010, provisional application No. 61/353,347, filed on Jun. 10, 2010.

(51) Int. Cl.
*H04W 76/04* (2009.01)
*H04W 68/02* (2009.01)
*H04L 29/12* (2006.01)
*H04W 36/08* (2009.01)
*H04W 88/02* (2009.01)
*H04W 80/04* (2009.01)

(52) U.S. Cl.
CPC ......... *H04W 68/02* (2013.01); *H04W 76/046* (2013.01); *H04W 80/04* (2013.01); *H04W 88/02* (2013.01)

(58) Field of Classification Search
USPC .......................................................... 370/331
See application file for complete search history.

(56) References Cited

U.S. PATENT DOCUMENTS

| | | |
|---|---|---|
| 2007/0082669 A1 | 4/2007 | Colban |
| 2007/0211688 A1* | 9/2007 | Park .................. H04W 52/0216 370/347 |
| 2008/0008122 A1 | 1/2008 | Yoon |
| 2008/0248817 A1 | 10/2008 | Gao et al. |
| 2009/0022108 A1 | 1/2009 | Liu |
| 2009/0093262 A1 | 4/2009 | Gao et al. |
| 2009/0316696 A1 | 12/2009 | Zhao |
| 2010/0049789 A1 | 2/2010 | Zhao |
| 2010/0124898 A1 | 5/2010 | Qu et al. |
| 2010/0195568 A1 | 8/2010 | Iimori |
| 2010/0304689 A1 | 12/2010 | McBeath et al. |
| 2011/0014919 A1 | 1/2011 | Otte et al. |
| 2011/0058480 A1 | 3/2011 | Dahlen |
| 2011/0164609 A1* | 7/2011 | Lee .................... H04W 76/026 370/352 |
| 2011/0176414 A1 | 7/2011 | De Franca Lima et al. |
| 2011/0176512 A1 | 7/2011 | Sun |
| 2011/0176536 A1 | 7/2011 | De Franca Lima et al. |
| 2011/0286427 A1* | 11/2011 | Shirota ................ H04W 68/12 370/331 |
| 2011/0299491 A1* | 12/2011 | Jang .................. H04M 3/42042 370/329 |
| 2011/0310794 A1* | 12/2011 | Jang .................... H04M 7/1235 370/328 |
| 2012/0008512 A1 | 1/2012 | Wahlqvist et al. |
| 2013/0070684 A1* | 3/2013 | Yu ........................ H04W 68/00 370/328 |

FOREIGN PATENT DOCUMENTS

| | | |
|---|---|---|
| WO | 2007/035061 | 3/2007 |
| WO | 2008/115037 | 9/2008 |

OTHER PUBLICATIONS

U.S. Appl. No. 13/011,566, Office Action dated Jun. 18, 2013, 14 pages.
U.S. Appl. No. 13/011,566, Office Action dated Dec. 15, 2014, 18 pages.
U.S. Appl. No. 13/011,566, Office Action dated Aug. 13, 2015, 17 pages.
U.S. Appl. No. 13/011,566, Office Action dated Jun. 9, 2016, 22 pages.
U.S. Appl. No. 13/011,566, Notice of Allowance dated Sep. 15, 2016, 14 pages.
3GPP, Enhanced CS fallback to 1xRTT with PS Handover, Jun. 27, 2009, 3GPP TSG-SA WG2 Meeting #74, S2-094550.
3GPP2, E-UTRAN—cdma200 1x Connectivity and Interworking Air Interface Specification, Apr. 2010, 3GPP2 C. S0097-0.
3GPP TS 23.272 v9.1.0 (Sep. 2009) 3rd Generation Partnership Project; Technical Specification Group Services and System Aspects; Circuit Switched Fallback in Evolved Packet System; Stage 2 (Release 9). Sep. 2009.
European Patent Office Application No. 11734888.8, Search Report dated Dec. 20, 2016, 10 pages.
3GPP TS 23.272 v10.2.1 (Jan. 2011): 3rd Generation Partnership Project; Technical Specification Group Services and System Aspects; Circuit Switched (CS) fallback in Evolved Packet System (EPS); Stage 2 (Release 10).
Nokia Siemens Networks, et al., "Enhanced CS fallback to 1xRTT with PS Handover," 3GPP TSG-SA WG2 Meeting #74, S2-094550, Jul. 2009, 20 pages.
The State Intellectual Property Office of the People's Republic of China Application Serial No. 201180006696.3, Office Action dated Jun. 5, 2014, 7 pages.
3rd Generation Partnership Project (3GPP), "Technical Specification Group Services and System Aspects; Circuit Switched Fallback in Evolved Packet System; Stage 2 (Release 9)," 3GPP TS 23.272 V9.1.0, Sep. 2009, 60 pages.

* cited by examiner

FIG. 6

| Field | Lenght (bits) |
|---|---|
| Message ID | 8 |
| GCSNAOption | 8 |
| AlternativeGCSNAOption_INCL | 1 |
| NumAlternativeGCSNAOptions | 0 or 8 |

IF NUMAlternativeGCSNAOptions field is included, NumAlternativeGCSNAOptions occurrences of the following field: Otherwise, 0 occurrences of the following field:

| | |
|---|---|
| AlternativeGCSNAOption | 8 |
| } | |
| IWSIDIncl | 1 |
| IWS_ID | 0 or 16 |
| AckRequired | 1 |
| StopDupDetect | 1 |
| MessageSequence | 6 |
| Reserved | 0 or 7 |
| TLACEncapsulated1xL3PDU | Variable |

GCSNA1xCircuitService message

FIG. 7

TLACEncapsulated1xL3PDU

| Field | Lenght (bits) |
|---|---|
| 1xLogicalChannel | 1 |
| 1xProtocolRevision | 8 |
| MsgType | 8 |
| NumTLACHeaderRecords | 4 |

NumTLACHeaderRecords occurrences of following fields:
{

| TLACHeaderRecordType | 4 |
|---|---|
| TLACHeaderRecordLength | 8 |
| TLACHeaderRecord | 8 x TLACHeaderRecordLength |

}

| Reserved | 3 or 7 |
|---|---|
| 1xL3PDULength | 16 |
| 1xL3PDU | 1xL3PDULength x 8 |

FIG. 8

General page message

| Field | Lenght (bits) |
|---|---|
| CONFIG_MSG_SEQ | 6 |
| ACC_MSG_SEQ | 6 |
| CLASS_0_DONE | 1 |
| CLASS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PEIELD | 8 x ADD_LENGTH |

FIG. 9

PDU format for mobile station addressed page

| Field | Lenght (bits) |
|---|---|
| SERVICE_OPTION | 0 or 16 |

FIG. 10

Enhanced broadcast page

| Field | Lenght (bits) |
|---|---|
| BCN | 3 |
| TIME_OFFSET | 10 |
| REPEAT_TIME_OFFSET | 0 or 5 |
| ADD_BCAST_RECORD | 0 or 8 x EXT_BCAST_-SDU_LENGTH (see [4]) |

FIG. 11

Feature notification message

| Field | Lenght (bits) |
|---|---|
| RELEASE | 1 |

One or more occurrences of the following record:
{

| RECORD_TYPE | 8 |
|---|---|
| RECORD_LEN | 8 |
| Type-specific fields | 8 x RECORD_LEN |

FIG. 12

Called party number

| Type_Specific Field | Lenght (bits) |
|---|---|
| NUMBER_TYPE | 3 |
| NUMBER_PLAN | 4 |

Zero or more occurrences of the following field:
{

| CHARi | 8 |
|---|---|

}

| RESERVED | 1 |
|---|---|

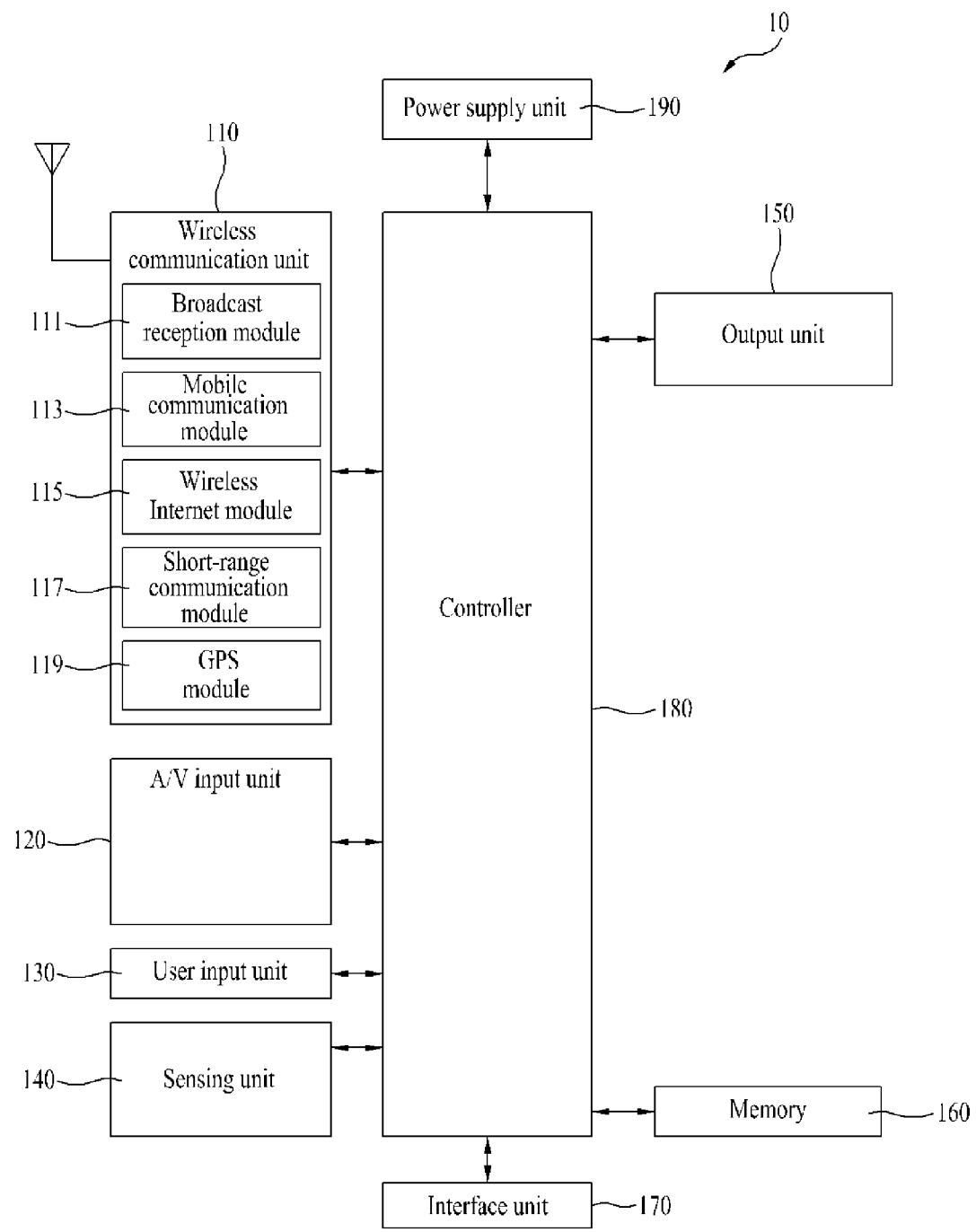

US 9,820,194 B2

1X MESSAGE BUNDLING

CROSS-REFERENCE TO RELATED APPLICATIONS

This application is a continuation of U.S. patent application Ser. No. 13/011,566, filed on Jan. 21, 2011, now U.S. Pat. No. 9,585,120, which claims the benefit of U.S. Provisional Application No. 61/297,192, filed on Jan. 21, 2010, 61/297,175, filed on Jan. 21, 2010, and 61/353,347, filed on Jun. 10, 2010, the contents of which are all hereby incorporated by reference herein in their entirety.

FIELD OF THE INVENTION

The present invention generally relates to wireless communications, and in particular, to paging techniques for a terminal in a wireless communication system.

DISCUSSION OF THE RELATED ART

Wireless communication systems are widely deployed to provide various communication content such as voice, video, packet data, messaging, broadcast, and the like. These wireless systems employ various access schemes capable of supporting multiple users by sharing the available system resources. A universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). A long term evolution (LTE) type cellular network of UMTS is under discussion by the 3rd generation partnership project (3GPP) that standardized UMTS.

SUMMARY

In accordance with an embodiment, a method includes receiving, at a network entity, a circuit switched paging request, wherein the paging request is for a UE that is attached to a packet data network and is registered to a circuit switched network. The method also includes obtaining a calling party number from the circuit switched network, the calling party number being information corresponding to a call from a party calling the UE, and generating a Generic Circuit Service Notification Application (GCSNA) message comprising more than one message of the circuit switch technology and one of the messages comprises the calling party number. Another operation relates to transmitting, from the network entity to the UE, the circuit service notification message, the transmitting occurring while the UE is attached to the packet data network and while the UE is operating in an active state for receiving and/or transmitting packet data or signaling messages.

In accordance with another embodiment, a method for receiving call information in a UE includes operating the UE in an attached mode such that the UE is attached to a packet data network, and operating the UE in a registered mode, during at least a portion of time during the attached mode, such that the UE is registered to a circuit switched network. The method further includes receiving, at the UE from a network entity, a GCSNA message comprising more than one message of the circuit switch technology and one of the messages comprises a calling party number that is information corresponding to a call from a party calling the UE, and where the receiving occurs while the UE is in the attached mode and while the UE operates in an active state for receiving and/or transmitting packet data or signaling messages.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

FIG. 6 depicts a GCSNA message and various fields in accordance with embodiments of the present invention.

FIG. 7 depicts a message and various fields in accordance with embodiments of the present invention.

FIG. 8 depicts a general page message (GPM) and various fields in accordance with embodiments of the present invention.

FIG. 9 depicts a PDU format for a mobile station addressed page.

FIG. 10 depicts an enhanced broadcast page that may be implemented in accordance with various embodiments of the present invention.

FIG. 11 depicts a feature notification message (FNM) that may be implemented in accordance with various embodiments of the present invention.

FIG. 12 depicts a calling part number message that may be implemented in accordance with various embodiments of the present invention.

FIG. 15 is a block diagram showing in more detail various components which may be implemented in a mobile terminal according to various embodiments of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the LTE system. However, alternatives to such implementations are envisioned, and teachings with regard to LTE are generally applicable to other standards and air interfaces as well. Moreover, the use of certain terms to describe various embodiments should not limit such embodiments to a certain type of wireless communication system, such LTE. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), LTE-Advanced, and the global system for mobile communications (GSM). By way of non-limiting example only, further description will relate to an LTE system, but such teachings apply equally to other system types.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
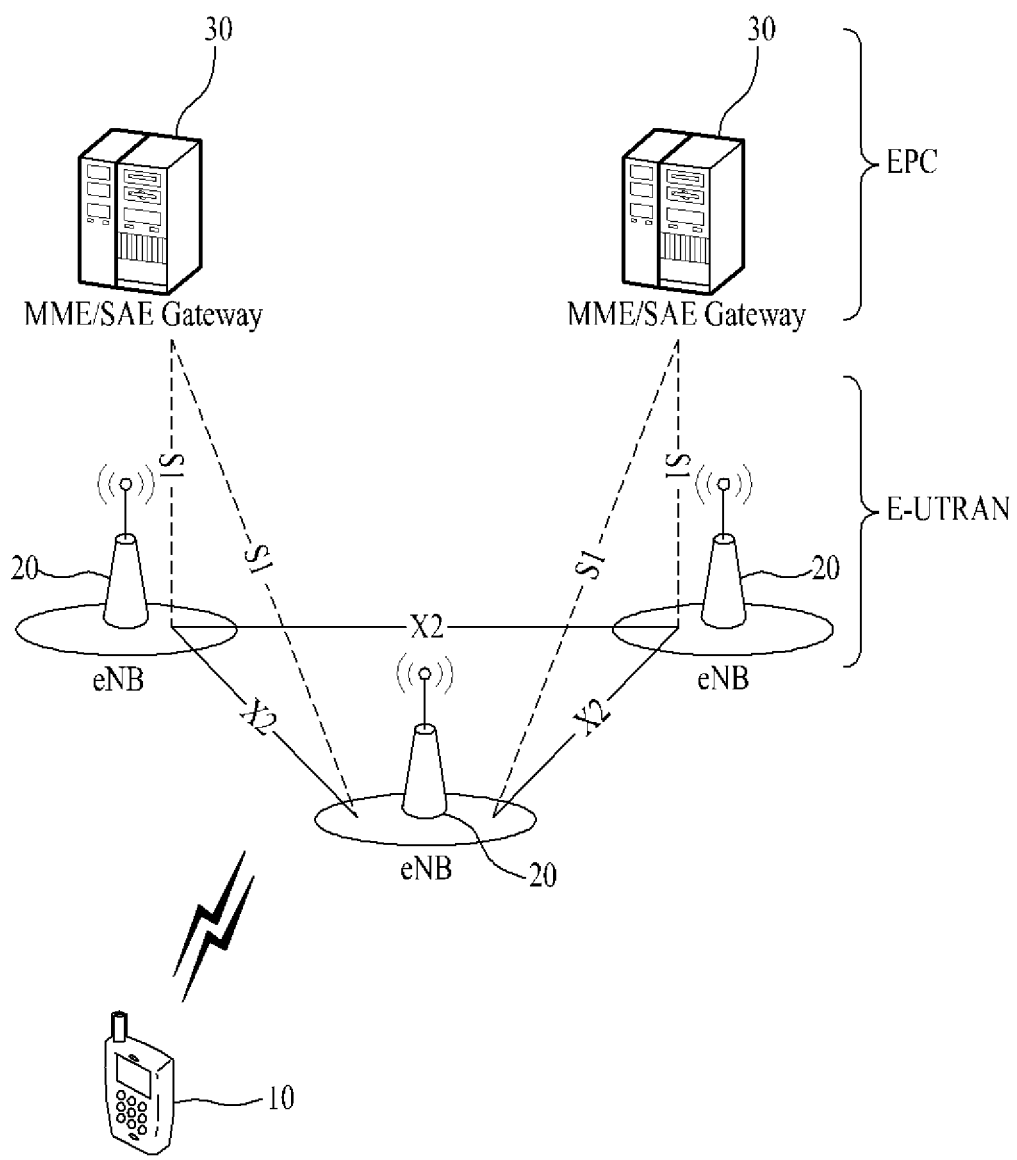
FIG. 1 is a block diagram of a network structure of an evolved universal mobile telecommunication system (E-UMTS) in accordance with various embodiments of the present invention.

FIG. 1 is a block diagram of a network structure of an evolved universal mobile telecommunication system (E-UMTS) in accordance with various embodiments of the present invention. The E-UMTS may be also referred to as an LTE system. The system may be widely deployed to provide a variety of communication services such as voice and packet data, and is generally configured to function based upon the various techniques presented herein and discussed in more detail with regard to later figures.

With reference to FIG. 1, the E-UMTS network includes an evolved UMTS terrestrial radio access network (E-UTRAN), an Evolved Packet Core (EPC), and one or more mobile terminals (or user equipment (UE)) 10. The E-UTRAN includes one or more eNodeBs 20. Regarding the EPC, MME/SAE gateway 30 provides an end point of a session and mobility management function for the UE 10. The eNodeB 20 and the MME/SAE gateway 30 may be connected via an S1 interface.

The UE 10 is a communication device carried by a user and may also be referred to as a mobile station (MS), a user terminal (UT), a subscriber station (SS) or a wireless device.

The eNodeB 20 is generally a fixed station that communicates with the UE 10. In addition to being referred to as a base station, the eNodeB 20 may also be referred to as an access point. An eNodeB 20 provides end points of a user plane and a control plane to the UE 10. In general, the eNodeB includes a transmitter and processor, among other components, and is configured to operate in accordance with the various techniques presented herein.

A plurality of UEs 10 may be located in one cell. One eNodeB 20 is typically deployed per cell. An interface for transmitting user traffic or control traffic may be used between eNodeBs 20. As used herein, "downlink" refers to communication from the eNodeB 20 to the UE 10, and "uplink" refers to communication from the UE to the eNodeB.

The MME gateway 30 provides various functions including distribution of paging messages to eNodeBs 20, security control, idle state mobility control, SAE bearer control, and ciphering and integrity protection of non-access stratum (NAS) signaling. The SAE gateway 30 provides assorted functions including termination of U-plane packets for paging reasons, and switching of the U-plane to support UE mobility. For ease of description, the MME/SAE gateway 30 may be referred to herein as simply a "gateway". However, it is understood that such a structure may also include both an MME gateway and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
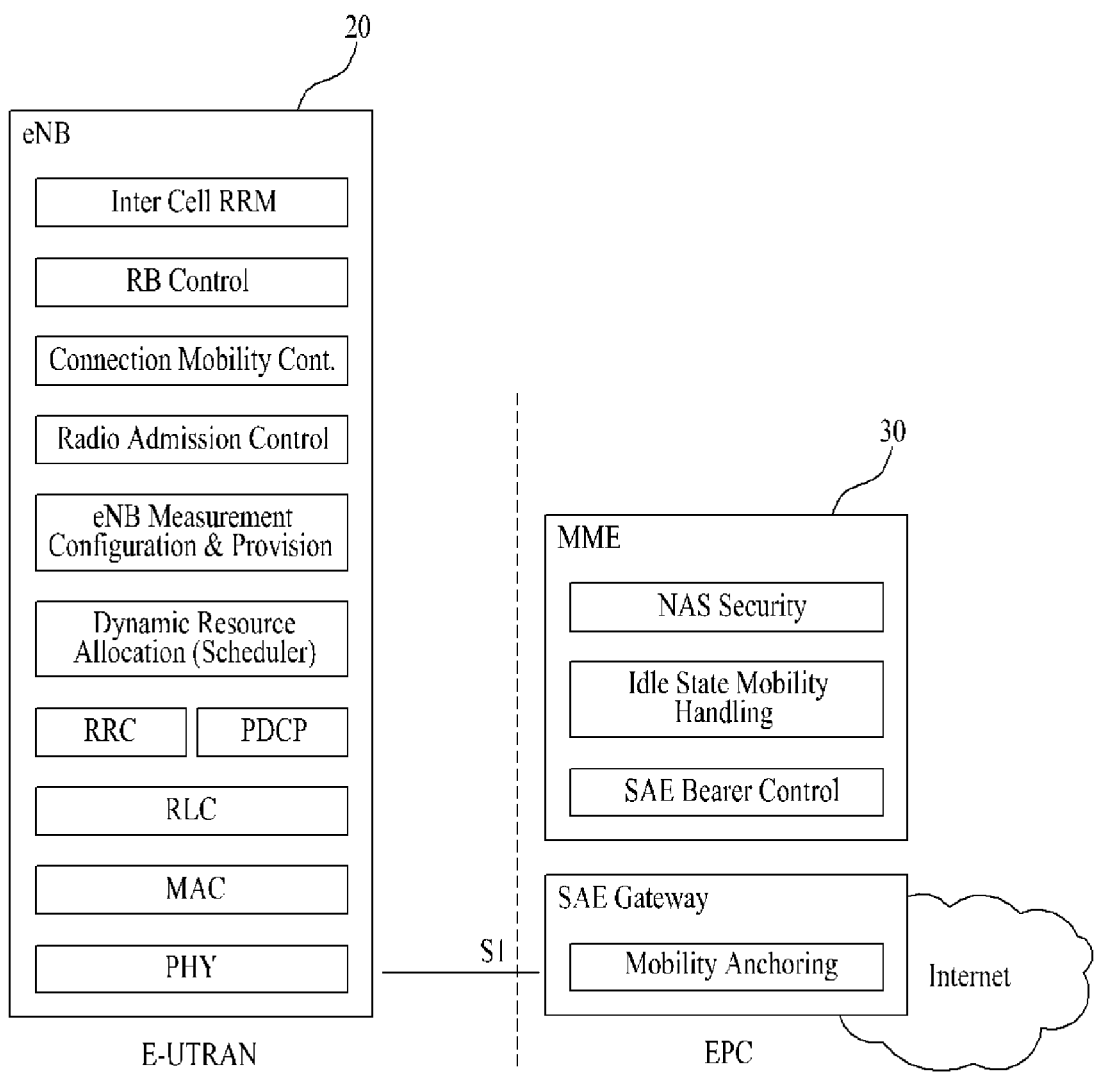
FIG. 2(a) is a block diagram depicting a general structure of a typical E-UTRAN and that of a typical EPC.

FIG. 2(a) is a block diagram depicting a general structure of a typical E-UTRAN and that of a typical EPC. With reference to FIG. 2(a), eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state.

In the EPC, and as described above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
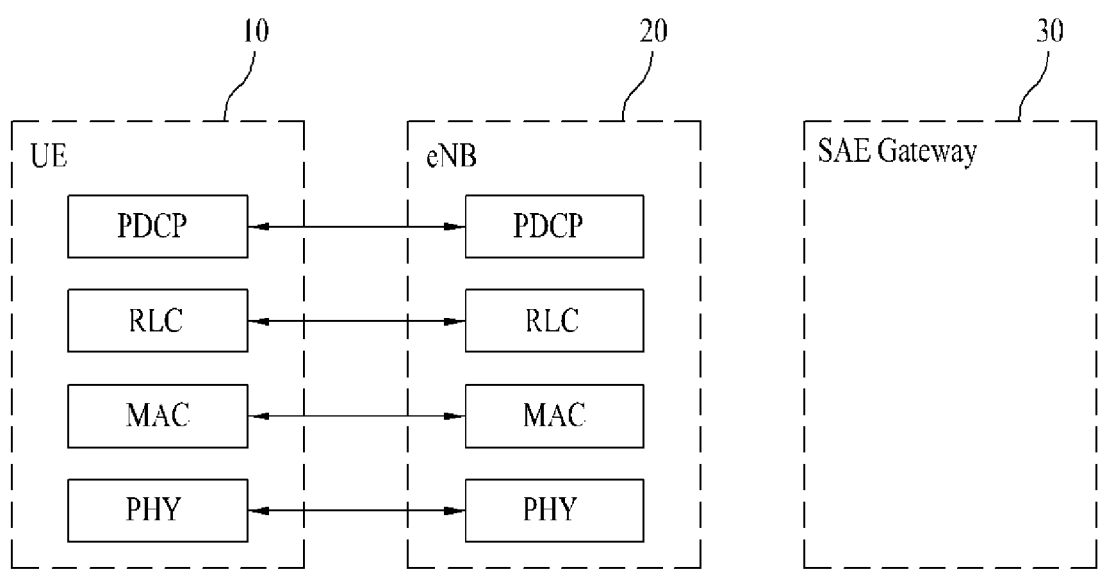
FIGS. 2(b) and 2(c) are block diagrams depicting the user-plane protocol and the control-plane protocol stack for a E-UMTS network.
Figure 2C:
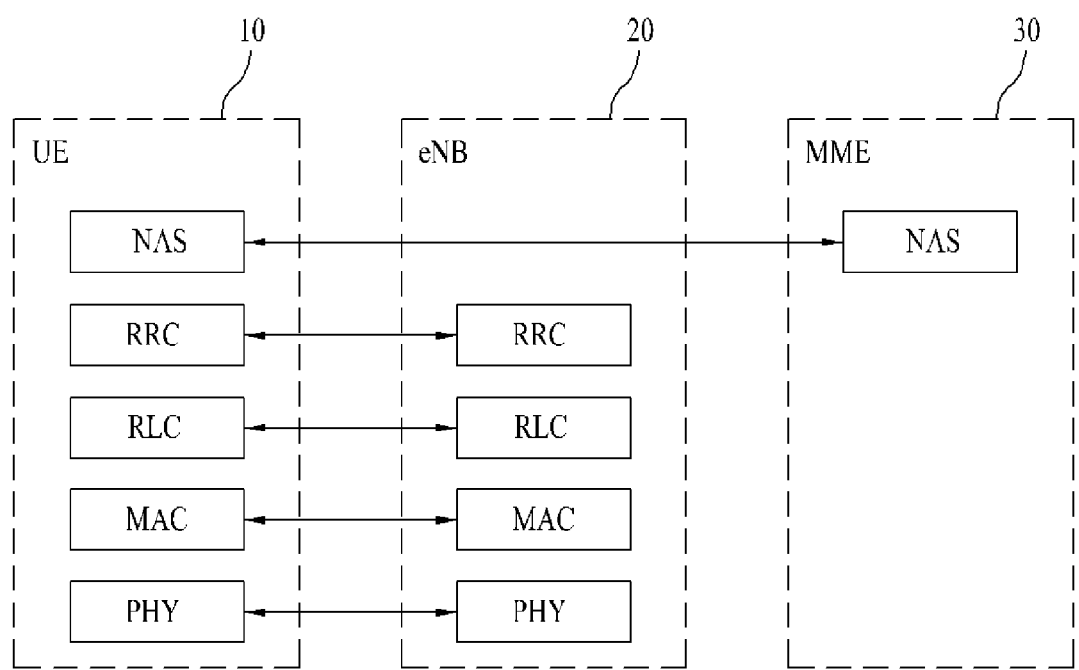

FIGS. 2(b) and 2(c) are block diagrams depicting the user-plane protocol and the control-plane protocol stack for the E-UMTS network. With reference to FIGS. 2(b) and 2(c), the protocol layers may be divided into a first layer (L1), a second layer (L2) and a third layer (L3) based upon the three lower layers of an open system interconnection (OSI) standard model as known in the art of communication systems.

The first layer L1 (or the physical layer) provides an information transmission service to an upper layer using a physical channel. The physical layer is connected with a medium access control (MAC) layer located at a higher level through a transport channel, and data between the MAC layer and the physical layer are transferred via the transport channel. Between different physical layers, namely, between physical layers of a transmission side and a reception side (for example, between physical layers of UE 10 and eNodeB 20), data are transferred via the physical channel 21.

The MAC layer of Layer 2 (L2) provides services to a radio link control (RLC) layer (which is a higher layer) via a logical channel. The RLC layer of Layer 2 (L2) supports a reliable transmission of data. Although the RLC layer is shown in FIGS. 2(b) and 2(c) as being separate from the MAC layer, it is understood that the functions of the RLC layer may be performed by the MAC layer and that, therefore, a separate RLC layer is not required. With reference to FIG. 2(b), the packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

With reference to FIG. 2(c), a radio resource control (RRC) layer located at the lowest portion of the third layer (L3) is typically only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

With reference to FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

With reference to FIG. 2(c), the RLC and MAC layers (terminated in an eNodeB 20 on the network side) perform the same or similar functions as for the control plane. The RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Also, the RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in the RRC-IDLE state, no RRC context is stored in the eNodeB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

It is generally understood that the LTE network or UE has challenges operating with IMS (Internet Multimedia Subsystem) voice services. The usual arrangement is for the LTE network to connect to a 1×RTT network to provide 1× Circuit Switch Fallback (1×CSFB) for voice service. The MME is typically positioned to connect to 1×IWS via a S102 interface. UEs operating in the system are capable of functioning with both 1×RTT and LTE, and may be enhanced with generic circuit services notification application protocol (GCSNA) to communicate with 1×IWS for 1× signaling transactions when the UE is active in LTE. The UE and IWS communicate with each other for such things as 1× registration, paging, SMS, origination, handoff, and the like.

Figure 3:
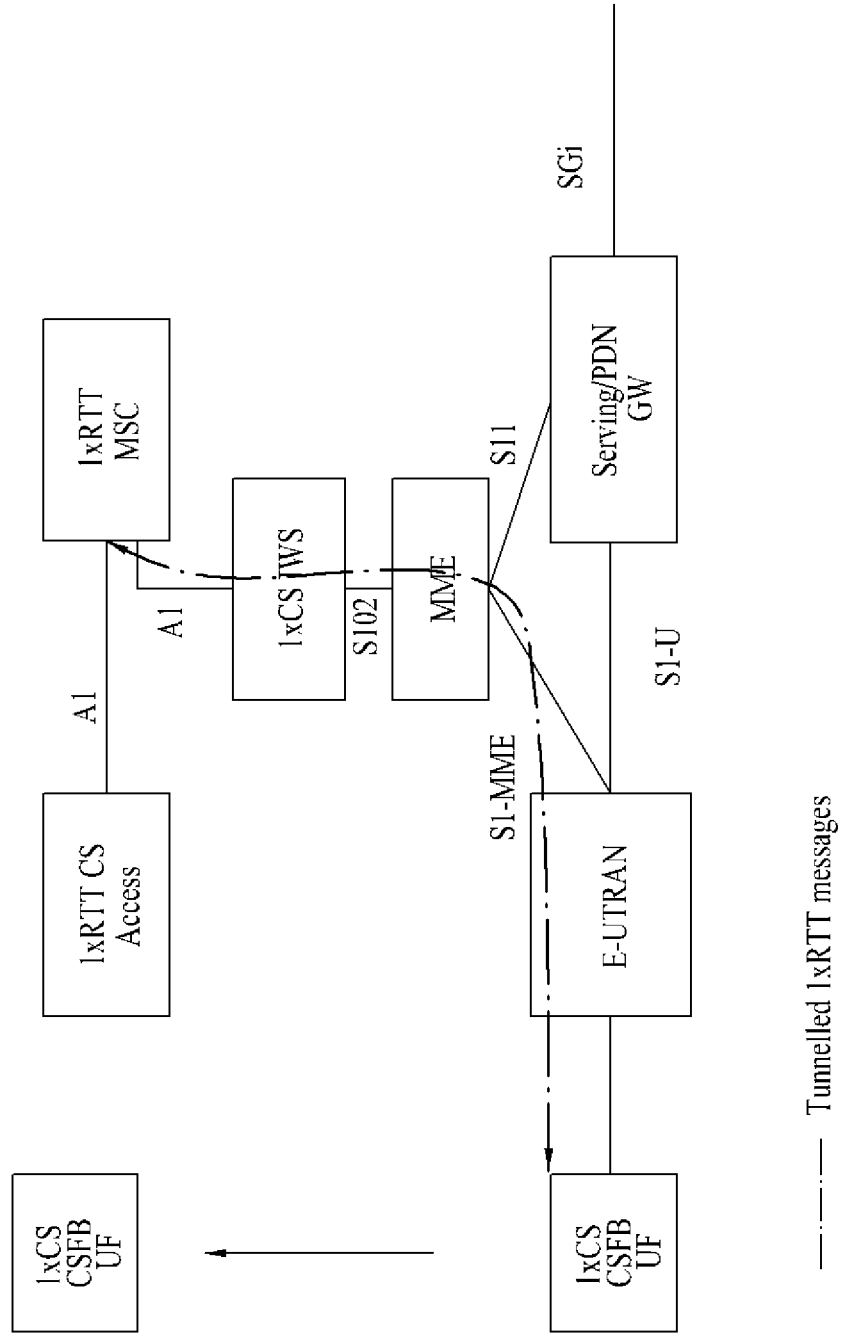
FIG. 3 is a block diagram depicting architecture for CS fallback to 1×RTT in accordance with embodiments of the present invention.

FIG. 3 is a block diagram depicting architecture for CS fallback to 1×RTT in accordance with embodiments of the present invention. It is understood that some or all of the aspects of the UE, E-UTRAN, and MME depicted in this figure may be implemented by the corresponding entities shown in FIGS. 1 and 5, for example. Referring still to FIG. 3, the CS fallback for 1×RTT in an evolved packet system (EPS) typically enables the delivery of CS-domain services (e.g. CS voice) by reuse of the 1×CS infrastructure when the UE is served by the E-UTRAN or similar entity. A CS fallback enabled terminal, while connected to the E-UTRAN, may register in the 1×RTT CS domain in order to be able to use 1×RTT access to establish one or more CS services in the CS domain. The CS fallback function may be available where E-UTRAN coverage overlaps with 1×RTT coverage.

CS Fallback to 1×RTT and IMS (IP multimedia subsystem) based services may function so that they are able to coexist in the same operator's network. The CS fallback in EPS may be realized by reusing the S102 reference point between the MME and the 1×CS IWS. The S102 interface may be implemented as the reference point between the MME and the 1×CS IWS. The S102 reference point may provide a tunnel between the MME and a 3GPP2, for example, 1×CS IWS to relay 3GPP2 1×CS signaling messages. It is understood that 1×CS signaling messages include those messages that are defined for an A21 interface as often implemented in the 3GPP2 specifications.

The UE is generally capable of CS fallback to 1×RTT and SMS, for example, over 1×CS and supports access to E-UTRAN/EPC as well as access to the 1×CS domain over 1×RTT. The UE typically supports the following additional functions:

1×RTT CS registration over the EPS after the UE has completed the E-UTRAN attachment;
 1×RTT CS re-registration due to mobility;
 CS fallback procedures specified for 1×RTT CS domain voice service; and
 Procedures for mobile originated and mobile terminated SMS over E-UTRAN.

The MME may be configured to enable CS fallback to 1×RTT and to support the following additional functions:
 Serve as signaling tunneling end point towards the 1×CS IWS via the S102 interface for sending/receiving encapsulated 1×CS signaling messages to/from the UE, which are encapsulated in S1-MME S1 information transfer messages;
 1×CS-IWS (terminating S102 reference point) selection for CSFB procedures;
 Handling of S102 tunnel redirection in the case of MME relocation;
 Buffering of messages received via S102 for UEs in the idle state.

The E-UTRAN may be enabled for CS fallback to 1×RTT and typically supports the following additional functions:
 Provision of control information that causes the UE to trigger 1×CS registration;
 Forwarding 1×RTT CS paging request to the UE;
 Forwarding 1×RTT CS related messages between the MME and UE; and Release of E-UTRAN resources after UE leaves E-UTRAN coverage subsequent to a page for CS fallback to 1×RTT CS.

Figure 4:
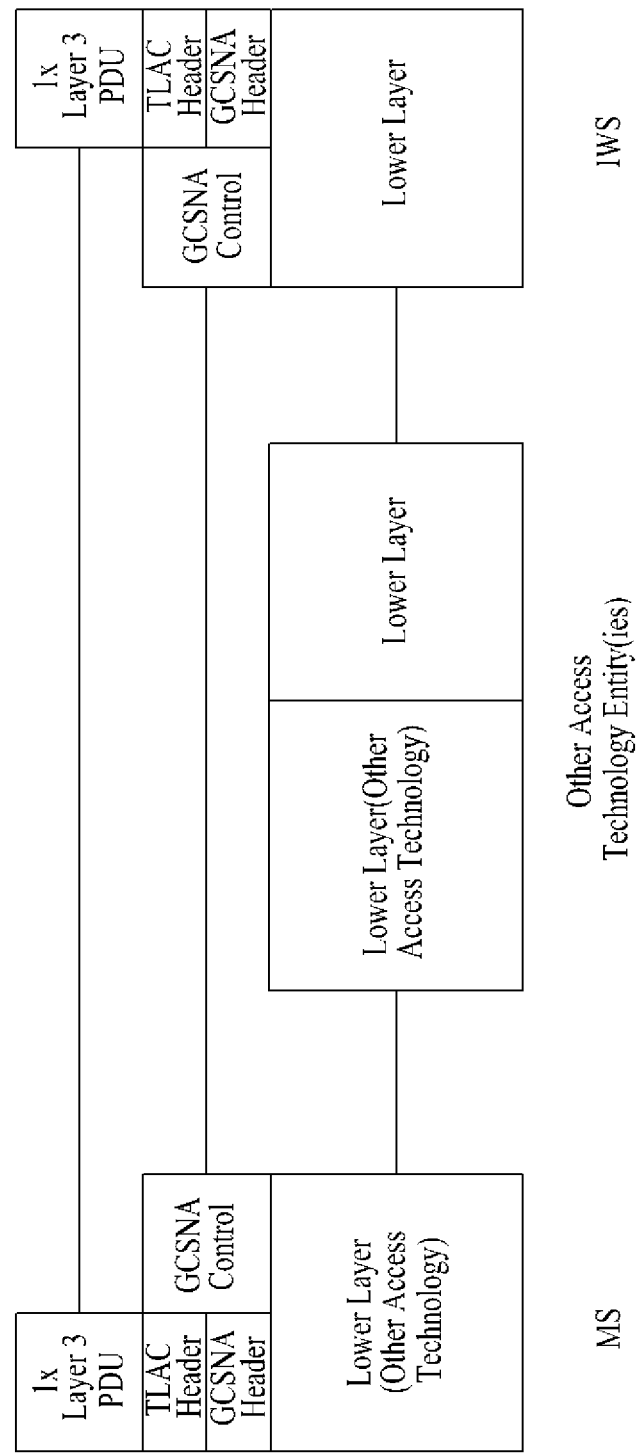
FIG. 4 depicts a protocol stack for various entities according to embodiments of the present invention.

FIG. 4 depicts a protocol stack for various entities according to embodiments of the present invention. Depicted is a generic circuit services notification application (GCSNA) protocol that supports signaling transactions for cdma2000 1× circuit-switched services between the mobile station (e.g., UE 10) and 1×CS IWS through various radio access technologies which provide a tunnel between the mobile station and IWS.

As presented herein, the term IWS is generally used without regard to the placement of the IWS, such that it may be configured to be standalone, collocated with the base station controller, and the like. In general, the IWS may be configured to provide message translation, 1× parameters storage, and RAND generation.

Message Translation refers to the function that translates between IOS A1/A1p messages received from/sent to the MSC and 1× air interface signaling messages sent/received over other access technology. The 1× parameters storage stores 1× radio parameters required for GCSNA support. RAND generation provides the random challenge value (RAND) used for 1× authentication. This function may be in another access technology. If the IWS supports RAND generation and 1× parameter provisioning, a RAND value provided by the IWS to the mobile station takes precedence over a RAND value provided to the mobile station by a node in the other access technology.

Figure 5A:
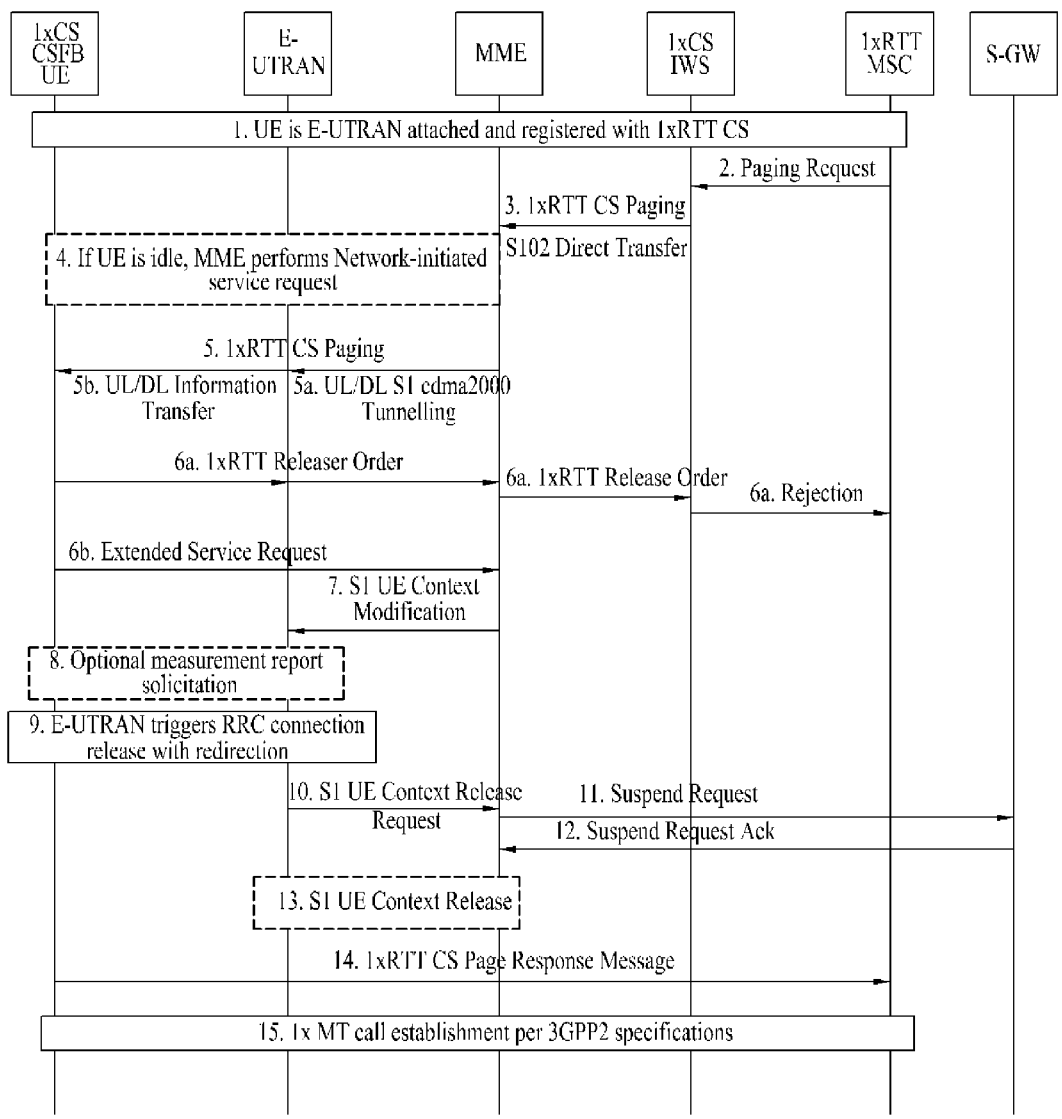
FIG. 5a depicts signaling flow for paging and other procedures according to various embodiments of the present invention.

FIG. 5a depicts signaling flow for paging and other procedures according to various embodiments of the present invention. It is understood that some or all of the aspects of the UE, E-UTRAN, MME, MSC, S-GW depicted in this figure may be implemented by the corresponding entities shown the previous figures, for example. In general the depicted procedures include the scenario of a mobile terminating call procedure when the UE accepts or rejects CS paging for the CS fallback to 1×RTT, for example.

By way of overview of one example, when the 1×MSC receives a registration from a UE, it may make note of the radio access network (RAN) equipment from which it received the registration. Subsequent paging activities may thus be directed toward that RAN equipment. However, paging activities by the MSC are not limited to the single RAN equipment from which the registration was received. The MSC may choose to page a wider area, including inter-system paging. If the MSC has direct interfaces to 1×CS IWS, as well as to 1×RTT access, the MSC may choose to do direct paging activities to both the E-UTRAN and 1×RAN equipment in its attempts to contact the UE.

The paging request is sent by the MSC to the IWS and is ultimately delivered to the UE via the tunnel. The UE tunes to 1×RTT access, acknowledges the 1× page and performs the 1×CS procedures for a mobile terminated call. When the UE receives a page message, it may not want to accept it based on caller line identification or pre-provisioned local policy, for example. In that case, according to an embodiment, the UE sends the 1× Release Order to 1×CS IWS over a tunnel in E-UTRAN and EPC.

With this overview, various operations in accordance with assorted embodiments of FIG. 5a will now be described in more detail. In particular, operation 1 includes the UE being attached to the E-UTRAN and being registered with the 1×RTT CS network.

Operation 2 shows the MSC sending a paging request to the CS IWS node with caller line identification, if available. The content of this paging request may vary, and such alternatives will be described in more detail in conjunction with alternative embodiments.

Operation 3 is where the 1×CS IWS node forwards the 1×RTT CS paging request and any included information by sending corresponding 1×RTT message(s) to the MME via the S102 tunnel.

In operation 4, if the UE is in idle state, the MME may perform a network initiated service request procedure in order to bring the UE to active state prior to tunneling of the 1×RTT CS paging request toward the UE.

Operation 5 relates to the MME forwarding the 1×RTT CS paging request to the UE. More specifically, in operation 5b, there is uplink and downlink information transfer and tunneling. In some approaches, the UE would proceed with operation 6b, leaving the LTE and establishing an 1×RTT connection. Then, after the 1×RTT connection is established, the UE would receive an 1×RTT message containing the calling party number or other caller identification. At that point the user of the UE can decide whether to take the call. Packet service interruption may occur if the user rejects the call. This is denoted as approach A.

Another approach, denoted as approach B, is that the network informs UE the calling party number before UE taking further actions in step 6. For example, the IWS in step 3 sends the 1×RTT General Page Message (GPM) and Feature Notification Message (FNM) messages to the UE, conditioned on that 1×RTT MSC in step 2 is capable of providing calling number with the CS paging request. It is understood that these messages are encapsulated in GCSNA 1×CircuitService messages, and the current GCSNA 1×CircuitService messages can only include a single 1× message. In over-the-air (OTA) scenarios, sometimes related L3 messages are bundled, such as a page message and a message conveying the calling party number (FNM) used in this example. It is often useful for the logics of MS processing that these messages are unchanged when 1× messages are tunneled (e.g. related events can be informed to user together).

In situations involving the LTE, for example, consider next an RRC message such as: MobilityfromEUTRA, DL/UL information Transfer, or ULHandoverPreparationTransfer. Such messages may include up to one GCSNA message. Although the MAC/RLC PDU of the LTE may contain multiple RRC messages, the eNB, MME generally only act as a transport entity so they are not aware the types of 1× messages transported. In such scenarios, the eNB scheduler cannot decide what RRC messages should be scheduled in the same MAC/RLC PDU.

In this approach, under the assumption that one GCSNA message can only contain up to one 1×RTT message, when the UE receives a GPM, it typically does not know whether there is a FNM coming. A timer, for example, needs to be implemented to prevent the UE going to proceeding to operation step 6b before receiving the FNM. When utilized, the timer increases CSFB delay if there is no FNM. This is because the eNB does not know the significance of the 1×RTT messages, and there is no guarantee it will concatenate the two downlink information transfer messages in the same LTE MAC/RLC packet.

To avoid this problem, the two 1×RTT messages may be bundled as one GCSNA message by IWS in step 3 to be forwarded transparently by E-UTRAN network.

Regardless of which approach is taken, in operation 6a, if the UE decides to reject CSFB (e.g., user decision by the caller line identification or the UE locally preprovisioned policy), then the UE may reject the 1× CS paging by sending an 1× Release Order to the MME. The MME forwards the 1× release order in an S102 direct transfer message to the 1×CS IWS, which then sends a rejection to the MSC. This completes the procedure under the UE rejection scenario.

Under a UE accept scenario, in operation 6b, if the UE accepts CS paging for the CS Fallback to 1×RTT, the UE sends an extended service request (e.g., CS fallback indicator) to the MME and proceeds with operations 7-15. It is to be understood that operations 7-15 are but one example of the UE acceptance scenario, and that many other operations are possible. As such, the specifics regarding the operations that follow this scenario are not critical or essential features of many embodiments of the present invention.

For example, in operation 7, the MME sends to the E-UTRAN UE context modification information (e.g., UE capabilities, CS Fallback Indicator, etc.) to indicate to the E-UTRAN to move the UE to 1×RTT.

In operation 8, the E-UTRAN may optionally solicit a measurement report from the UE to determine the target 1×RTT cell to which the CS Fallback will be performed. Next, the E-UTRAN triggers an RRC connection release with redirection to 1×CS (operation 9). In operation, 10, the E-UTRAN sends an S1 UE context release request (cause) message to the MME. The cause message indicates that the S1 UE context release was caused by the CS fallback to 1×RTT.

Operation 11 is where the MME sets the UE context to suspended status and sends to the S-GW a suspend request (IMSI) message that requests the suspension of EPS bearers for the UE. The S1-U bearers are released for all EPS bearers by the MME and all GBR bearers are deactivated. The non-GBR bearers are preserved and are marked as suspended in the S-GW.

Operation 12 refers to the S-GW acknowledging the suspend request message and marks the UE as suspended. When a downlink data arrives at the S-GW, the S-GW should not send a downlink data notification message to the MME if the UE is marked as suspended.

Operation 13 relates to the S1 UE context in the E-UTRAN as being released, which leads to the UE tuning to the 1×RTT and acknowledging the page by transmitting a 1×RTT paging response message over the 1× access channel (operation 14).

In operation 15, the UE subsequently performs the procedure for mobile terminated call establishment as specified in 3GPP2, for example. Once CS service ends in the 1×CS domain, the UE returns to the E-UTRAN by performing reselection. The EPS service may also be resumed. It is understood that some or all of the processes with regard to the paging request and included data may be performed by any of the network entities (and sub-entities) shown in FIG. 5a (e.g., E-UTRAN, MME, IWS, MSC, etc.).

In accordance with further embodiments, it is to be understood that the CS paging request may include a general page message (GPM) that is encapsulated in another message (e.g., GCSNA1×CircuitService, also referred to herein as "G1CS") and is transported from the IWS to the UE. General flow of the process of FIG. 5a in these embodiments include:

G1CS is encapsulated in a S102 direct transfer message from the IWS to the MME;
G1CS is encapsulated in a downlink S1 cdma2000 tunneling message from the MME to the eNB; and
G1CS is encapsulated in an RRC downlink information transfer message from the eNB to UE.

When the MME receives a S102 message from the 1×IWS, if the UE is idle, it proceeds to page the UE, then the UE can establish a LTE RRC connections to the eNB, and a S1 signaling connection associated with the UE can then be setup between the MME and eNB, for example.

In view of this further overview, according to further embodiments, reference is made back FIG. 5a, and in particular to operation 1 which includes the UE being attached to the E-UTRAN being registered with the 1×RTT CS network.

Operation 2 shows the MSC sending the paging request to the CS IWS node. In some embodiments, this paging request is a circuit switched paging request that is received at a network entity (e.g., the IWS). This paging request is for the UE that is attached to a packet data network and is registered to a circuit switched network. At some point, data (e.g., calling party number) is obtained from the paging request. This calling party number is data corresponding to a call from a party calling the UE. Another feature of this operation relates to generating a circuit service notification message having a general page message and a feature notification message, such that the feature notification message includes the calling party number. Specific examples of these messages are shown and described in later figures.

Operation 3 is where the 1×CS IWS node forwards the 1×RTT CS paging request and any included information to the MME via the S102 tunnel. If 1×CS IWS has calling party number information obtained from step 2, it generates a G1CS message, which bundles GPM and FNM (with calling party number). The G1Cs message is then encapsulated in a S102 direct transfer message sent from the IWS to the MME.

In operation 4, if the UE is in idle state, the MME may perform a network initiated service request procedure in order to bring the UE to active state prior to tunneling of the 1×RTT CS paging request toward the UE. It is noted that in operation 4, such action is not required if the UE is already active on the LTE. As such, the MME uses the S1-C to transport the G1CS to the eNB and the eNB uses an RRC message to transport G1CS to the UE. In some situations, the MME and/or eNB do not know of the type of information that is included in the G1CS message, and instead have limited knowledge that it is a tunneled payload related to 1×RTT.

In operation 5, consider now the scenario in which the calling party number is carried in the G1CS message. As such, the UE receives from the network entity the G1CS message having a general page message and a feature notification message. Since the UE has information about the calling party (e.g., calling party number in the feature notification message), the UE can quickly decide whether to accept or reject the call based upon this information.

Notably, the UE in this embodiment has knowledge of the calling party number while the UE is in an active state for receiving and/or transmitting packet data. In other words, the UE receives via the circuit service notification message (and included data) a calling party number regarding an incoming CS call. Further, the UE may obtain this data prior to acting in operations 6a, 6b, and later operations.

In accordance with other features, if desired, the UE may act on this calling party number (e.g., receive or reject call) without delay or use of a timer. Recall that other embodiments utilize a timer in situations in which the calling party number is not included in the received circuit service notification message. The reason for such delay is to permit the UE to remain in the active "packet data" state while waiting for a further message that includes such calling party number (which may or may not arrive). Again, when the calling party number is included in the circuit service notification message, the UE has ready access to the calling party number, and thus, it is not necessary to implement a delay or timer.

In accordance with alternative embodiments, the method of FIG. 5a may be performed without using the features associated with operations 6a (e.g., the release order and associated rejection). UE rejects the CS call by simply not performing step 6 and beyond and stays in the E-UTRAN network.

Another approach, denoted as approach C, in accordance with still further embodiments is where the calling party number is conveyed to the UE with the 1×RTT channel assignment. Compared to the approach A in which the calling part number is provided after UE tunes to 1×, the approach C provides the feature that the legacy 1×RTT network does not need to be upgraded to route the calling party information to a 1×RTT base station controller UE is going to be connected to. However, when compared to the approach B in which 1×RTT MSC is upgraded to send calling party number with a paging request and a message containing the calling party number is bundled together with the 1×RTT page message in one GCSNA message, the UE needs to leave the LTE network temporarily if the user does not want to take the call.

The following issues may be considered in order to realize approach B and C: a 1×RTT L3 message Y carrying the calling party number usually comes after another 1×RTT L3 message X (such as GPM or Universal Handoff Direction message), the network should make sure the UE can receive messages X and Y at the same time. If the network fails to deliver them together, the UE based on the 1×RTT protocol may act on message X only, resulting in the UE either not being able to receive Y via the LTE network, or not being able to take into account the information in Y before responding to message X.

Typically, a single LTE RRC message cannot contain more than one GCSNA message. For example in approach C, if UE receives a MobilityfromEUTRA RRC message carrying a GCSNA message which only carries message X, the UE would proceed with handover to 1×RTT and would not wait for another GCSNA message carrying message Y. The eNB is usually able to concatenate different packets or messages in the same physical layer packet for UE to receive them together. However, because the eNB does not know the significance of the 1×RTT messages carried in separate GCSNA messages, there is no guarantee it will concatenate the two RRC messages with each carrying a different GCSNA message, in the same LTE MAC/RLC packet.

To avoid such problem, the two 1×RTT messages may be bundled as one GCSNA message by IWS in step 12 to be forwarded transparently by E-UTRAN network.

Figure 5B:
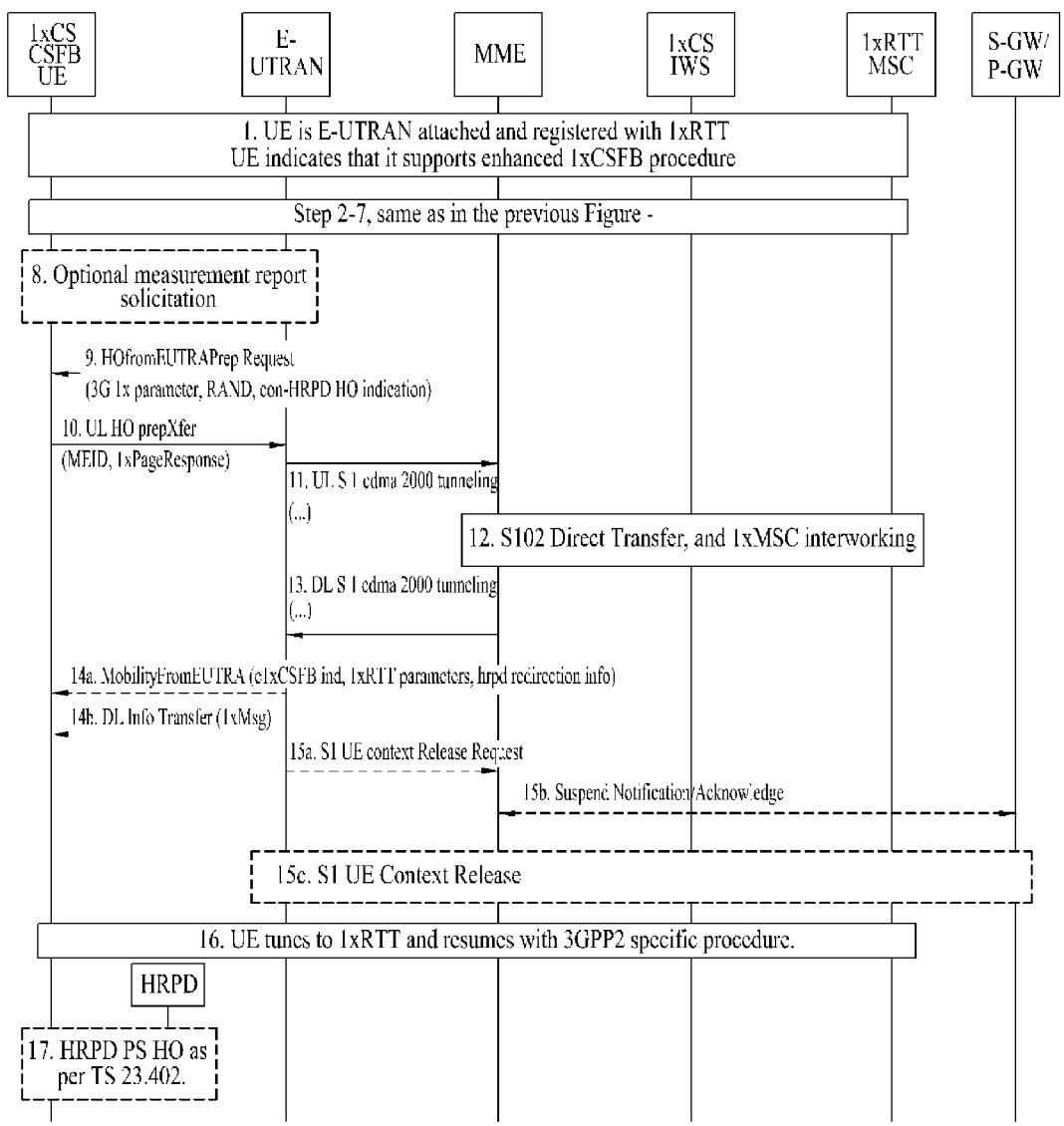
FIG. 5b depicts signaling flow for paging and other procedures according to further various embodiments of the present invention.

FIG. 5b depicts signaling flow for paging and other procedures according to various embodiments of the present invention, namely approach C. It is understood that some or all of the aspects of the UE, E-UTRAN, MME, MSC, S-GW depicted in this figure may be implemented by the corresponding entities shown the previous figures, for example. In general the depicted procedures include the scenario of a mobile terminating call procedure when the UE accepts or rejects CS paging for the CS fallback to 1×RTT, for example.

In operation 1 the UE is E-UTRAN attached and pre-registered with 1×RTT. Next, operations 2-7 may be performed in accordance with the various embodiments set forth and described with regard to FIG. 5a. In some embodiments of FIG. 5b, the operations associated with step 6a (FIG. 5a) are omitted. For instance, when omitting operation 6a, operation 6b is performed such that the UE sends an Extended Service Request for mobile terminating 1×CS fallback to the MME and the method proceeds with operations 7-17 below.

Operation 7 includes the MME sending UE Context Modification Request (CS Fallback Indicator) to indicate the E UTRAN to move the UE to 1×RTT. If a priority value or emergency indication was received in operation 3, the MME also sets priority indication to the E-UTRAN. The E-UTRAN provides preferential treatment to this call in the subsequent steps. The E-UTRAN responds with UE Context Modification Response.

Operation 8 is where the E-UTRAN may optionally solicit a 1×RTT measurement report from the UE to determine the target 1×RTT cell to which the CS Fallback will be performed. If the network supports PS handover procedure to HRPD then E-UTRAN may optionally solicit an HRPD measurement report from the UE to determine whether the target HRPD candidates exist or not.

In operation 9, the E-UTRAN sends a HandoverFromE-UTRAPreparation Request message to the UE to start the enhanced 1×CS fallback procedure. It includes 3G1× Overhead Parameters and RAND value. This message also includes an indication that concurrent HRPD handover preparation is not required. When both the network and the UE support enhanced CS Fallback to 1×RTT for dual receiver/transmitter configuration and the UE belongs to Release-10 or later, the E-UTRAN may after operation 7 decide, e.g. due to RF conditions, to direct the UE to turn on its second radio to 1×RTT and retry the 1×CS call directly on the 1×RTT access network. For this case, the E-UTRAN in the HandoverFromE-UTRAPreparation Request message includes a redirection indicator along with optional redirection information. The procedure stops after this step and the UE tunes its 1× radio and retries its 1× call in 1×RTT while still receiving/transmitting data on E UTRAN.

Operation 10 is where the UE initiates signaling for establishment of the CS access leg by sending UL HandoverPreparation Transfer message which contains the GCSNA1×CircuitService message containing an 1×RTT page response message. In operation 11, the E-UTRAN relays the GCSNA1×CircuitService message to MME via UL S1 cdma2000 tunneling message Operation 12 is where messages between the MME and 1×IWS are tunneled using the S102 interface. The 1×RTT MSC informs IWS the calling party number if available. The IWS sends back a GCSNA1×CircuitService message containing 1×RTT Universal Handoff Direction message and optionally an Alert With Information message. The calling party number is included in the Alert With Information message Operation 13 is where the MME relays the GCSNA1× CircuitService message to E-UTRAN via DL S1 cdma2000 tunneling message.

The E-UTRAN performs either operation 14a or 14b, such that 14b is typically only performed when both the E-UTRAN and UE support enhanced 1× CS fallback procedure for dual receiver/transmitter configuration and the UE belongs to Rel. 10 or later. Operation 14a is where the E UTRAN sends MobilityfromEUTRA Command to the UE with indication that this is for enhanced 1× CS Fallback operation, 1×RTT related information (GCSNA1×Circuit-Service message), and optionally the HRPD redirection information or HRPD messages. The 1×RTT information contains GCSNA1×CircuitService message containing 1×RTT messages related to 1× channel assignment, calling party number and cause the UE to tune to and acquire this 1× channel. This is perceived by the UE as a Handover Command message to 1×RTT. If 1×RTT CS network cannot support this CSFB request (for example due to resource availability), the DL information transfer message is sent instead, with an embedded 1× message that indicates failure to the UE.

If the network does not support PS handover procedure to HRPD or if no target HRPD candidates exist then E-UTRAN shall release the S1 UE context (see operation 15a/b) after executing the enhanced CS fallback to 1×RTT procedure.

For either concurrent non-optimized PS handover procedure or optimized idle-mode PS handover procedure along with enhanced CS fallback to 1×RTT, E-UTRAN may also redirect the UE to HRPD as part of this procedure. This is indicated by the HRPD redirection information in the Mobility from EUTRA Command.

According to operation 14b, the E UTRAN sends a DL information transfer message, with the embedded GCSNA1×CircuitService message indicating 1×RTT preparation success to the UE. Operations 15 and 17 are usually not performed in this case.

According to operations 15a/b/c, if a PS handover procedure is not performed then E-UTRAN sends an S1 UE Context Release Request (Cause) message to the MME. Cause indicates that the S1 UE Context Release was caused by CS fallback to 1×RTT. The S1-U bearers are released and the MME starts the preservation and suspension of non-GBR bearers and the deactivation of GBR bearers towards S-GW and P-GW(s). The MME sets the UE context to suspended status.

In operation 16, the UE tunes to the 1×RTT radio access network and performs 1× channel acquisition with the 1×RTT CS access (e.g. 1×RTT BSS). A dual receiver/transmitter UE continues to receive/transmit data on E-UTRAN. UE sends 1×RTT Handoff complete message to the 1× network. If UE rejects the call, a Release Order message is transmitted to the 1× network, and the UE does not perform operation, but reselects back to E-UTRAN.

In operation 17, the UE and Network follow the appropriate procedure for handling non-optimized PS handover procedure or optimized idle-mode PS handover as defined in TS 23.402, for example, is performed. The S1 UE Context release procedure is as specified in TS 23.402, for example, for non-optimized PS handover (clause 8.2.2) or optimized idle-mode PS handover (clause 9.4). This step usually occurs in parallel with operation 16.

Embodiments will now be described in which two or more 1× message are included in the GCSNA1×CircuitService message. If desired, the GCSNA1×CircuitService message may use a number indicator to indicate the number of 1× messages carried in the message. One alternative is to include an indicator together with each contained 1× message to indicate whether there are more occurrences of other contained 1× messages afterwards. Such embodiments utilize various messages, some of which are encapsulated.

By way of non-limiting example, various embodiments will be described using messages such as the GCSNA1×CircuitService message, a TLACEncapsulated 1×L3PDU field, a GPM, a FNM, and other messages. These and other messages are shown with various fields by way of example only, and greater or fewer fields may be used. Some or all of the following messages may be implemented in the various messaging embodiments disclosed herein, including those depicted in FIGS. 5a and 5b.

FIG. 6 depicts a GCSNA message and various fields in accordance with embodiments of the present invention. The GCSNA message, which may be configured as a GCSNA1×CircuitService message, may be used to send a cdma2000 1× Layer 3 PDU (among other things). The message fields shown include:

GCSNAOption: the sender may set to a value representing a circuit switched service;

GCSNAClass: the sender may set this field to the GCSNA class to be set for this GCSNAOption field. The GCSNAClass values are defined based on GCSNAClassRevision The sender may set this field to the revision of the GCSNAClass to be set for this GCSNAOption field.

AlternativeGCSNAOption_INCL: If the AlternativeGCSNAOption field is included in this message, the IWS may set this field to '1'. Otherwise, the IWS may set this field to '0'. The mobile station usually sets this field to '0';

NumAlternativeGCSNAOptions: If AlternativeGCSNAOption_INCL is set to '1', the IWS may include and set this field to the number of AlternativeGCSNAOptions. Otherwise the sender may omit this field.

AlternativeGCSNAOption: The IWS may set AlternativeGCSNAOption(s) that the mobile station can use for receiving the 1× message over the tunnel in the decreasing order of preference.

IWSIDIncl: The IWS may set this field to '1' if the IWS_ID field is included in the message; otherwise, the IWS may set this field to '0'. The mobile station may set this field to '0'.

IWS_ID: If IWSIDIncl is set to '1', the IWS may set this field to its IWS_ID; otherwise, the IWS may omit this field. IWS_ID will typically be unique within an operator's network.

AckRequired: If the receiver is required to acknowledge the reception of this message, the sender may set this field to '1'. Otherwise, the sender may set this field to '0'.

StopDupDetect: The sender may set this field to '1' if the sender has reset the MessageSequence number and request the GCSNASequenceContextTimer(s) in the receiver to expire. Otherwise, the sender may set this field to '0'.

MessageSequence: The sender may set this field to one more (modulo 64) than the MessageSequence field of the last GCSNA1×CircuitService message that it sends. For a first GCSNA1×CircuitService message after protocol initialization or the first GCSNA1×CircuitService message after the MessageSequence number has been reset, the sender may select any initial value for this field.

Reserved: The sender may include reserved bits to make this message integral number of octets up to TLACEncapsulated1×L3PDU field. The sender may set all bits in this field to '0'. The receiver may ignore this field.

TLACEncapsulated1×L3PDU: The sender may set this field as specified in FIG. 7, for example. If desired, two or more of these fields may be included in the GCSNA message.

FIG. 7 depicts the TLACEncapsulated1×L3PDU field within a GCSNA1×CircuitService message and various sub-fields within the field in accordance with embodiments of the present invention. The TLACEncapsulated1×L3PDU field may include the representative sub-fields, but it is understood that greater or fewer fields may alternatively be used. In some embodiments, the mobile station and/or IWS use the TLACEncapsulated1×L3PDU format described in this section to encapsulate a cdma2000 1× Layer 3PDU. The message fields include:

1×LogicalChannel: If the PDU field of this message is constructed as if for transmission on the f-csch or the r-csch 1× logical channel, then the sender may set this field to '0'. If the PDU field of this message is constructed as if for transmission on the f-dsch or the r-dsch 1× logical channel, then the sender may set this field to '1'.

1×ProtocolRevision: The sender sets this field to the protocol revision in which the sender has used to encode the 1×L3PDU (if included) and TLACHeaderRecord (if included).

MsgType: The sender may set this field as follows: r-csch: Set 2 MSBs to '00', and 6 LSBs to MSG_ID for r-csch messages. r-dsch: Set to 8-bit MSG_TYPE for r-dsch messages. Mini messages are usually not allowed. f-csch: Set 2 MSBs to '00', and 6 LSBs to MSG_ID for f-csch messages. f-dsch: Set to 8-bit MSG_TYPE for f-dsch messages, as mini messages are usually not allowed.

NumTLACHeaderRecords: The sender may set this field to the number of TLAC Header Records included in this message.

TLACHeaderRecordType: The sender may set this field to the type of TLAC Record as follows: 0x0: r-csch Addressing Sublayer Record; 0x1: r-csch Authentication and Message Integrity Sublayer Record.

TLACHeaderRecordLength: The sender may set this field to the number of octets contained in TLACHeaderRecord field.

TLACHeaderRecord: The sender may set this field as follows: If TLACHeaderRecordType is set to 0x0: The sender may set this record to addressing fields followed by padding bits, all set to '0', to make the record octet aligned.

Reserved: The sender may include reserved bits to make this TLACEncapsulated1×L3PDU integral number of octets. The sender may set all bits in this field to '0'.

1×L3PDULength: The sender may set this field to the length, in units of octets, of the 1×L3PDU field.

1×L3PDU: The sender may set this field to the cdma2000 1× Layer 3 PDU that is associated with the GCSNAOption, followed by padding bits, all set to '0', to make this field octet aligned.

FIG. 8 depicts a general page message (GPM) and various fields in accordance with embodiments of the present invention. In some embodiments, when Layer 3 at the base station sends a PDU corresponding to the GPM to Layer 2, it also sends the GPM Common fields to Layer 2. These GPM Common fields and PDUs may be used by Layer 2 to assemble a Layer 2 PDU.

FIG. 9 depicts a PDU format for a mobile station addressed page.

FIG. 10 depicts an enhanced broadcast page that may be implemented in accordance with various embodiments of the present invention. In particular, this message includes:

BCN (Broadcast Control Channel Number) includes if the NUM_BCCH_BCAST is equal to '000', the base station may set this field to '000' and this field is to be ignored by the mobile station. Otherwise, the base station may set this field to the Broadcast Control Channel number of the F-BCCH to which the mobile station is being redirected. The base station may not set this field to '000' (reserved) or '001'.

TIME_OFFSET (BCCH time offset) includes if the NUM_BCCH_BCAST is equal to '000', base station may set this field to one less than the time offset, in units of 40 ms, from the beginning of the slot in which this message began to the beginning of the Forward Common Control Channel slot to which the mobile station is being directed. Otherwise, the base station may set this field to one less than the time offset, in units of 40 ms, from the beginning of the slot in which this message began to the beginning of the Broadcast Control Channel slot to which the mobile station is being directed.

REPEAT_TIME_OFFSET (BCCH offset of repeat) includes if the EXT_BCAST_SDU_LENGTH_IND is set to '01' or '11', the base station may set this field as follows. The base station may set this field to one less than the time offset, in units of 40 ms, from the time specified by TIME_OFFSET to the beginning of the Forward Common Control Channel slot to which the mobile station is being directed for a repeat of the broadcast message. Otherwise, the base station may set this field to one less than the time offset, in units of 40 ms, from the time specified by TIME_OFFSET to the beginning of the Broadcast Control Channel slot to which the mobile station is being directed for a repeat of the broadcast message. Otherwise, the base station may omit this field.

ADD_BCAST_RECORD (Additional broadcast information record) includes where the base station may omit this field if EXT_BCAST_SDU_LENGTH_IND is set to '00' or '01'; otherwise, the base station may include EXT_BCAST_SDU_LENGTH octets in this field.

FIG. 11 depicts a feature notification message (FNM) that may be implemented in accordance with various embodiments of the present invention. In particular, this message includes:

RELEASE (Origination completion indicator): The base station may set this field to '1' if this message is used to complete an origination request from the mobile station; otherwise, the base station may set this field to '0'. In some instances, the base station may include occurrences of the following three-field record:

RECORD_TYPE (Information record type): The base station may set this field as required or desired.

RECORD_LEN (Information record length): The base station may set this field to the number of octets in the type-specific fields included in this record.

Type-specific fields: The base station may include type-specific fields as required or desired.

FIG. 12 depicts a calling part number message that may be implemented in accordance with various embodiments of the present invention. In particular, this message includes information for identifying the calling party's number and includes:

NUMBER_TYPE: The base station may set this field to the NUMBER_TYPE 6 value corresponding to the type of the calling number.

NUMBER_PLAN: Is the numbering plan in which the base station may set this field to the NUMBER_PLAN value corresponding to the numbering plan used for the calling number. If a presentation indicator is used, this field indicates whether or not the calling number should be displayed. The base station may set this field to the PI value corresponding to the presentation indicator. If a screening indicator is used, this field indicates how the calling number was screened. The base station may set this field to the SI value corresponding to the screening indicator value.

CHARi: Is a character in which the base stations may include one occurrence of this field for each character in the calling number. The base station may set each occurrence of this field to the ASCII representation corresponding to the character with the most significant bit set to '0'.

RESERVED: Are reserved bits in which the base station may set this field to '00000'.

Figure 13:
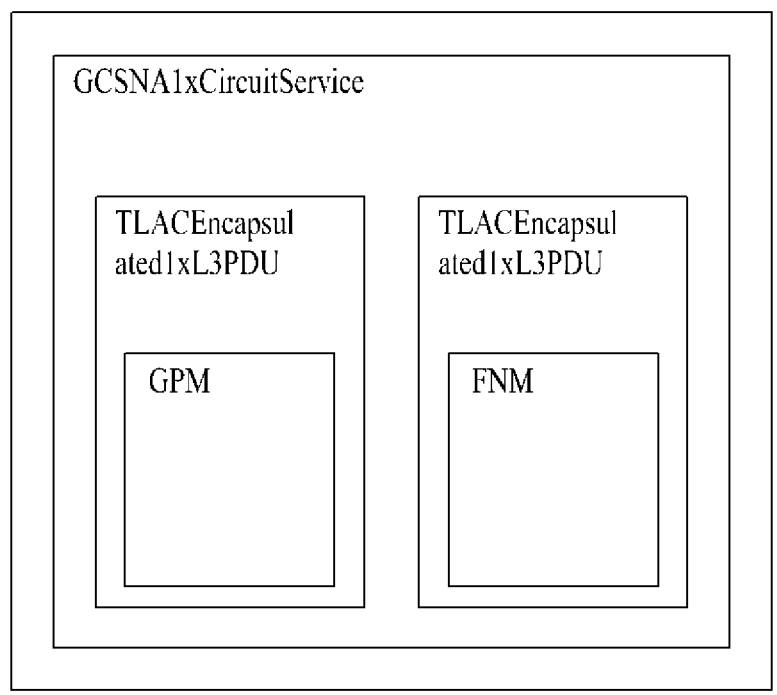
FIGS. 13 and 14 are block diagrams depicting examples in which a circuit service notification message includes a general page message and a feature notification message in accordance with various embodiments of the present invention.
Figure 14:
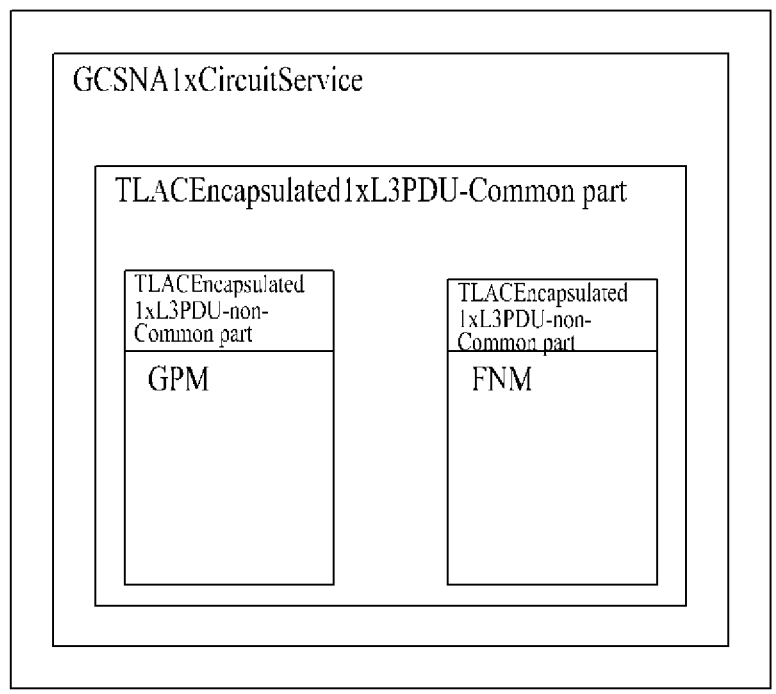

FIGS. 13 and 14 are block diagrams depicting examples in which enhancements are made to enable a GCSNA1× CircuitService message to include more than one 1×RTT L3 messages, such as a general page message and a feature notification message in accordance with various embodiments of the present invention. The messages carried by a GCSNA1×CircuitService message are not limited to these two 1×RTT L3 messages. For example, in another embodiment, the included messages can be Universal Handoff Direction and Alert With Information messages. In particular, FIG. 13 shows a GCSNA1×CircuitService message having two instances or fields of the TLACEncapsulated1× L3PDU. One instance of this field includes the GPM message and the other instance of this field includes the FNM. Put another way, the circuit service notification message may be generated by including the general page message in a first TLACEncapsulated1×L3PDU field of the GCSNA1× CircuitService message, and including the feature notification message in a second TLACEncapsulated1×L3PDU field of the GCSNA1×CircuitService message. In an embodiment, the illustrated messages and fields may be implemented as follows: GCSNA1×CircuitService message (FIG. 6), TLACEncapsulated1×L3PDU (FIG. 7), GPM (FIG. 8), and FNM (FIG. 11).

In FIG. 14, the GCSNA1×CircuitService message has one instance or field of the TLACEncapsulated1×L3PDU-common part, which is common for the both encapsulated 1×RTT L3 messages, and non-common parts which include the two 1×RTT L3 messages. In other words, the GCSNA1× CircuitService message may be generated by including multiple 1×RTT L3 messages in separate sub fields of a single field of the GCSNA1×CircuitService message.

In accordance with still further embodiments, there are situations where a 1× network is congested, and the UE in the LTE network with CSFB does not know the congestion and proceeds to access with CSFB, causing more congestion. Recall that the congestion my lead to emergency calls being dropped. Consider the scenario in which the LTE network is not congested, otherwise, the LTE access barring kicks in and non-emergency AT would not request NO-CSFB in initially.

One mechanism to address this matter is to transmit access persistent parameters in LTE, wherein the IWS rejects/drops the 1× tunneled message when 1× is congested. Problems may arise when the IWS itself is congested. In some cases, the eNB redirects all 1×CSFB MO-calls using rel. 8 mechanisms, and the UE can determine whether the system is congested after being redirected to 1×. In some cases, this mechanism may cause interruption of LTE service as the UE decides to backoff in 1×.

The parameters for congestion control is signaled using GCSNA1×Parameters defined by 3GPP2, which is part of the mobility Parameters IE in RRC CSFBParametersResponseCDMA2000 message and HandoverFromEUTRAPreparationRequest message. In some cases, the UE stays on the LTE after receiving one of the 2 RRC messages with congestion control and decides not to continue CSFB procedures (i.e. Registration, MO-SMS, MO-CS call).

In the registration/MO-SMS scenario, the congestion parameters are signaled to the UE by RRC CSFBParametersResponseCDMA2000 message. The UE is then required to receive this message in order to get the RAND value for the 1× message authentication, and other required 1× parameters. If the UE decides not to access 1× through a tunnel, it does not transmit the ULInformationTransfer message which contains the 1× registration or data burst message In the Mo-CS call scenario, the congestion parameters are signaled to UE by RRC HandoverFromEUTRAPreparationRequest message. The UE is required to receive this message in order to get the RAND value for the 1× message authentication and other required 1× parameters to originate a 1× call.

If the UE decides not to access 1×, it does not transmit the ULHandoverPreparationTransfer message which contains the 1× message for call origination. If the eNB does not receive ULHandoverPreparationTransfer message for an implementation dependent duration, it notifies the MME that the UE's extended service request is canceled (e.g., by UE context modification failure message with cause value).

A MME itself can determine if the extended service request is canceled if it has not received an UL S1cdma2000 tunneling message, or any reply on UE context modification from eNB. One benefit is that the UE (regardless of 1×CSFB support) does not need to wake up for SIB8 updates on congestion parameters.

FIG. 15 is a block diagram showing in more detail various components which may be implemented in a mobile terminal (e.g., UE 10 of FIG. 1) according to various embodiments of the present invention. It is understood that greater or fewer components than those shown may be implemented. In this figure, the mobile terminal, as referred to herein as UE 10, may include a wireless communication unit 110, audio/video (A/V) input unit 120, user input unit 130, sensing unit 140, output unit 150, memory 160, interface 170, controller 180, and power supply 190. Two or more of the just-noted components may be incorporated into a single unit or divided into two or more smaller units.

Wireless communication unit 110 generally includes a transmitter and a receiver. For example, this unit may include broadcast reception module 111, mobile communication module 113, wireless Internet module 115, short-range communication module 117, and global positioning system (GPS) module 119.

Broadcast reception module 111 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

Broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 111 may be stored in memory 160. The mobile communication module 113 transmits wireless signals to or receives wireless signals from at least one or more of a base station, an external station, and a server through a mobile communication network. The wireless signals may include various types of data according to whether the mobile terminal transmits/receives voice call signals, video call signals, or text/multimedia messages.

The wireless Internet module 115 may be a module for wirelessly accessing the Internet. The wireless Internet module 115 may be embedded in the mobile terminal or may be installed in an external device.

The short-range communication module 117 may be a module for short-range communication. The short-range communication module may use various short-range communication techniques such as Bluetooth®, radio frequency identification (RFID), infrared data association (IrDA), ultra wideband (UWB), and ZigBee®.

GPS module 119 may receive position information from one or more satellites (e.g., GPS satellites). A/V input unit 120 may be used to receive audio signals or video signals. The A/V input unit may include one or more cameras and a microphone. The camera may processes various image frames such as still images or moving images captured by an image sensor during a video call mode or an image capturing mode. The image frames processed by the camera may be stored in memory 160 or may be transmitted outside the mobile terminal through the wireless communication unit 110.

User input unit 130 generates data based on user input for controlling the operation of the mobile terminal. The user input unit may be implemented as a keypad, a dome switch, a touch pad (either static pressure or constant electricity), a jog wheel, or a jog switch. In particular, if the user input unit is implemented as a touch pad and forms a mutual layer structure along with an associated display, the display and user input unit may be collectively referred to as a touch screen.

Sensing unit 140 determines a current state of the mobile terminal such as whether the mobile terminal is opened or closed, the position of the mobile terminal and whether the mobile terminal is placed in contact with a user. In addition, the sensing unit 140 generates a sensing signal for controlling the operation of the mobile terminal. For example, when the mobile terminal is a slider-type mobile phone, sensing unit 140 may determine whether the mobile terminal is opened or closed. In addition, the sensing unit may determine whether the mobile terminal is powered by power supply unit 190 and whether interface unit 170 is connected to an external device.

Sensing unit 140 may include one or several sensors such as acceleration sensors. Acceleration sensors are a type of device for converting an acceleration variation into an electric signal. With recent developments in micro-electro-mechanical system (MEMS) technology, acceleration sensors have been widely used in various products for various purposes. For example, an acceleration sensor may be used as an input device for a computer game and may sense the motion of the human hand during a computer game.

Output unit 150 may output audio, video, alarms, and the like. The output unit typically includes one or more displays to present various information processed by the mobile terminal. For example, if the mobile terminal is in a call mode, the display may show a user interface (UI) or a graphical user interface (GUI) for making or receiving a call. If the mobile terminal is in a video call mode or an image capturing mode, the display may present a UI or a GUI for capturing or receiving images.

If the display and user input unit 130 form a mutual layer structure and are thus implemented as a touch screen, the display may be used not only as an output device but also as an input device. If the display is implemented as a touch screen, the display may also include a touch screen panel and a touch screen panel controller. Examples of displays suitable for the mobile terminal include a liquid crystal display (LCD), a thin film transistor (TFT)-LCD, an organic light-emitting diode (OLED), a flexible display, a three-dimensional (3D) display, and the like.

Memory 160 is generally used to store various types of data to support the processing, control, and storage requirements of the mobile terminal. Examples of such data include program instructions for applications operating on the mobile terminal, contact data, phonebook data, messages, pictures, video, and the like. The memory may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory (e.g., secure digital (SD) or extreme digital (XD), or other similar memory or data storage device.

Interface unit 170 may interface with an external device that can be connected to the mobile terminal. The interface unit may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, an earphone, and the like.

Controller 180 typically controls the overall operations of the mobile terminal. For instance, the controller performs the control and processing associated with voice calls, data communications, video calls, camera operations and recording operations.

Power supply 190 provides power required by the various components of the mobile terminal. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controllers or processors included in the various apparatuses disclosed herein (e.g., mobile terminals, base stations, other network entities, and the like).

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Although various embodiments have been presented as being implemented using the exemplary series of operations described herein, additional or fewer operations may be performed. Moreover, it is to be understood that the order of operations shown and described is merely exemplary and that no single order of operation is required. In general, features of an embodiment may generally be applied to other embodiments.

The code in which exemplary embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The foregoing embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method, comprising:
    generating, by a network device, a general circuit service notification application (GCSNA) message,
    wherein the GCNSA message comprises a plurality of 1× messages including a first 1× message and a second 1× message,
    wherein the first 1× message is included in a first tunneled link access control (TLAC) encapsulated 1× layer 3 protocol data unit (PDU) field of the GCSNA message, and the second 1× message is included in a second TLAC encapsulated 1× layer 3 PDU field of the GCSNA message, and
    wherein the GCSNA message further comprises information indicating a number of the plurality of 1× messages; and
    transmitting, by the network device, the generated GCSNA message to a user equipment (UE).

2. The method according to claim 1, wherein the generated GCSNA message is transferred to the UE through a radio resource control (RRC) message.

3. The method according to claim 1, wherein the generated GCSNA message is transmitted through a tunneling message.

4. The method according to claim 1, further comprising:
    receiving, by the network device, a circuit switched paging request, wherein the circuit switched paging request is for the UE that is attached to a packet data network and is registered to a circuit switched network.

5. The method according to claim 1, wherein after transmitting the GCSNA message, the method further comprises:
    receiving a release order provided by the UE, the release order indicating rejection of a call from a party calling the UE.

6. The method according to claim 1, wherein the network device comprises an interworking solution (IWS).

7. The method according to claim 1, wherein the first 1× message is a general page message and the second 1× message is a feature notification message.

8. The method according to claim 1, wherein the first 1× message is a Universal Handoff Direction message and the second 1× message is an Alert With Information message.

9. A method, comprising:
    receiving, by a base station, a general circuit service notification application (GCSNA) message through a tunneling message,
    wherein the GCNSA message comprises a plurality of 1× messages including a first 1× message and a second 1× message,
    wherein the first 1× message is included in a first tunneled link access control (TLAC) encapsulated 1× layer 3 protocol data unit (PDU) field of the GCSNA message, and the second 1× message is included in a second TLAC encapsulated 1× layer 3 PDU field of the GCSNA message, and
    wherein the GCSNA message further comprises information indicating a number of the plurality of 1× messages; and
    transmitting, by the base station, the GCSNA message to a user equipment (UE) through a radio resource control (RRC) message.

10. The method according to claim 9, wherein the first 1× message is a general page message and the second 1× message is a feature notification message.

11. The method according to claim 9, wherein the first 1× message is a Universal Handoff Direction message and the second 1× message is an Alert With Information message.

12. A network device, comprising:
    a wireless communication unit; and
    a controller configured to:
    generate a general circuit service notification application (GCSNA) message,
    wherein the GCNSA message comprises a plurality of 1× messages including a first 1× message and a second 1× message,
    wherein the first 1× message is included in a first tunneled link access control (TLAC) encapsulated 1× layer 3 protocol data unit (PDU) field of the GCSNA message, and the second 1× message is included in a second TLAC encapsulated 1× layer 3 PDU field of the GCSNA message, and
    wherein the GCSNA message further comprises information indicating a number of the plurality of 1× messages, and
    control the wireless communication unit to transmit the generated GCSNA message to a user equipment (UE).

13. The network device according to claim 12, wherein the generated GCSNA message is transferred to the UE through a radio resource control (RRC) message.

14. The network device according to claim 12, wherein the generated GCSNA message is transmitted through a tunneling message.

15. The network device according to claim 12, wherein the network device comprises an interworking solution (IWS).

16. The network device according to claim 12, wherein the first 1× message is a general page message and the second 1× message is a feature notification message.

17. The network device according to claim 12, wherein the first 1× message is a Universal Handoff Direction message and the second 1× message is an Alert With Information message.

18. A base station, comprising:
a wireless communication unit; and
a controller configured to:
control the wireless communication unit to receive a general circuit service notification application (GCSNA) message through a tunneling message,
wherein the GCNSA message comprises a plurality of 1x messages including a first 1x message and a second 1x message,
wherein the first 1x message is included in a first tunneled link access control (TLAC) encapsulated 1x layer 3 protocol data unit (PDU) field of the GCSNA message, and the second 1x message is included in a second TLAC encapsulated 1x layer 3 PDU field of the GCSNA message, and
wherein the GCSNA message further comprises information indicating a number of the plurality of 1x messages, and
control the wireless communication unit to transmit the GCSNA message to a user equipment (UE) through a radio resource control (RRC) message.

19. The base station according to claim 18, wherein the first 1x message is a general page message and the second 1x message is a feature notification message.

20. The base station according to claim 18, wherein the first 1x message is a Universal Handoff Direction message and the second 1x message is an Alert With Information message.

* * * * *